United States Patent [19]
Altmann et al.

[11] Patent Number: 5,539,269
[45] Date of Patent: Jul. 23, 1996

[54] ELECTRICAL WINDSHIELD WIPER DRIVE

[75] Inventors: Manfred Altmann, Oldenburg; Peter Huebner, Rastede; Reinhard Orthmann, Mainz; Hans-Peter Schöner, Modautal-Brandau, all of Germany

[73] Assignee: Licentia Patent-Verwaltungs-GmbH, Frankfurt, Germany

[21] Appl. No.: 323,680

[22] Filed: Oct. 18, 1994

Related U.S. Application Data

[63] Continuation-in-part of Ser. No. 943,575, Sep. 11, 1992, abandoned.

[30] Foreign Application Priority Data

Sep. 11, 1991 [DE] Germany .............. 41 30 065.3

[51] Int. Cl.⁶ .................................... H01L 41/08
[52] U.S. Cl. ................... 310/316; 318/116; 310/323
[58] Field of Search ........................ 310/316, 317, 310/323, 328; 318/116

[56] References Cited

U.S. PATENT DOCUMENTS

| | | | |
|---|---|---|---|
| 4,560,263 | 12/1985 | Katsuma | 310/317 X |
| 4,562,374 | 12/1985 | Sashida | 310/323 |
| 4,727,276 | 2/1988 | Izukawa et al. | 310/316 |
| 4,794,294 | 12/1988 | Shimizu et al. | 310/316 |
| 4,866,357 | 9/1989 | Miller et al. | 318/443 |
| 4,914,336 | 4/1990 | Yamasaka | 310/316 X |
| 4,937,488 | 6/1990 | Fujie | 310/323 |
| 4,959,579 | 9/1990 | Kuwabara et al. | 310/323 |
| 4,980,599 | 12/1990 | Kuwabara et al. | 310/323 |
| 5,023,526 | 6/1991 | Kuwabara et al. | 310/323 X |
| 5,053,669 | 10/1991 | Saeki et al. | 310/323 |
| 5,053,670 | 10/1991 | Kosugi | 310/328 |
| 5,103,128 | 4/1992 | Adachi | 310/323 |
| 5,136,215 | 8/1992 | Izukawa | 310/316 |
| 5,148,075 | 9/1992 | Shirasaki | 310/323 |
| 5,155,418 | 10/1992 | Kataoka | 318/116 |
| 5,162,708 | 11/1992 | Naito | 318/116 |
| 5,164,629 | 11/1992 | Nakanishi | 310/323 |
| 5,165,047 | 11/1992 | Shimizu | 318/116 |
| 5,173,630 | 12/1992 | Tanaka | 310/316 |
| 5,198,732 | 3/1993 | Morimoto | 318/116 |
| 5,225,734 | 7/1993 | Nakanishi | 310/323 |
| 5,258,694 | 11/1993 | Ohnishi et al. | 318/135 |

FOREIGN PATENT DOCUMENTS

| | | |
|---|---|---|
| 0184312 | 4/1987 | European Pat. Off. . |
| 4131948 | 4/1992 | Germany . |

OTHER PUBLICATIONS

Patent Abstracts of Japan, vol. 14, No. 410 (M–1020), 5 Sep. 1990 & JP–A–02 158 440 (Honda Electron Co.) 18 Jun. 1990.

Patent Abstracts of Japan, vol. 13, No. 281 (M–842) (3629), 27 Jun. 1989) & JP–A–01 074 148 (Ichikoh), 20 Mar. 1989.

Primary Examiner—Mark O. Budd
Attorney, Agent, or Firm—Spencer & Frank

[57] ABSTRACT

An electrical windshield wiper drive for a vehicle, includes a windshield wiper arm and an electric motor drive in the form of an ultrasonic motor having a drive shaft connected to the windshield wiper arm for rotatably driving the wiper arm.

25 Claims, 6 Drawing Sheets

ELECTRICAL WINDSHIELD WIPER DRIVE

CROSS REFERENCE TO RELATED APPLICATIONS

The present application is a continuation-in-part application of U.S. application Ser. No. 07/943,575, filed Sep. 11, 1992, now abandoned. The present application also claims the rights of priority with respect to application Ser. No. P 41 30 065.3 filed Sep. 11, 1991, in Germany, the subject matter of which is incorporated herein by reference.

BACKGROUND OF THE INVENTION

The present invention relates to an electrical windshield wiper drive for a vehicle, such as a motor vehicle.

Prior art windshield wiper drives include electric motors, step-down gears and special parked position devices. The gear assembly is necessary to reduce the RPM (revolutions per minute) of the electromagnetic motors to the required wiper speed of 20 to 40 per minute. One drawback of this fixed gear assembly is that the angular range (field) and location of the range in which the windshield wiper operates is fixed. This gear assembly also determines the relative speed of the wipers as a function of the wiper position. Moreover, the gear assembly produces unpleasant and annoying noises and requires much space. The gear box for the windshield wiper motor must therefore be very large.

Another drawback of the prior art windshield wiper drives equipped with gear assemblies is that the wiping speed cannot be freely set with respect to vehicle and environmental conditions. Thus, it is not possible to realize optimum wiping quality under different weather conditions. The service life of the wiper blades is also adversely influenced by the fixed gear assembly.

SUMMARY OF THE INVENTION

It is therefore an object of the present invention to provide an electrical windshield wiper drive which operates quietly and with low wear, and is configured so that the size of the gear box is substantially reduced, the parked position and the wiping range of the wiper arm can be changed in a simple manner and can be adapted to given vehicle and environmental conditions.

The above and other objects are accomplished in accordance with the invention by the provision of an electrical windshield wiper drive for a vehicle, comprising: a windshield wiper arm; and electric motor drive means comprising an ultrasonic motor having a drive shaft connected to the windshield wiper arm for rotatably driving the windshield wiper arm.

The windshield wiper drive according to the invention permits, with the simplest of means, a freely controllable position of the windshield wiper, thus making it possible to assume a windshield wiper end position outside of the normal wiping field or to vary the position and size of the wiping range depending on requirements. During operation in winter, it is possible to let the wiper wipe only in the region in which a windshield heater is also effective. In heavy rain, it is possible to reduce the wiping range while keeping the wiping speed the same or raising it only slightly to free this region of water more frequently. In heavy rain the drive for the wiper on the passenger side may be interrupted.

By eliminating the gear box and making it possible to freely set the wiping speed, the wiping quality and the service life of the wiper blades are increased. By means of simple controls for the ultrasonic motor it is possible to realize a constant speed for the wiper blade over the entire wiping range which is a prerequisite for good wiping quality. It is additionally possible to slowly bend over the wiping lip of the wiper blade at the reversal point so that the service life of the wiper blade is increased compared to prior art wiper drives. Moreover, the windshield wiper drive according to the invention is further distinguished by a small structural depth and its low cost. Since the novel, gearless drive operates with frequencies in the ultrasonic range, no audible noises are produced.

The present invention includes an actuation circuit for driving the ultrasonic motor which is responsive to voltage encoded signals generated by a signal device for driving the ultrasonic motor in accordance with the operation of the windshield wiper drive. In greater detail, the present invention includes a signal device for selectively producing a voltage encoded signal for controlling an operation of the windshield wiper drive, and an actuation circuit. The actuation circuit includes a processor which is responsive to the voltage encoded signal for producing a control signal corresponding to the operation of the windshield wiper drive, and a drive circuit, such as a full bridge circuit, which is responsive to the control signal for producing a drive signal for driving the ultrasonic motor in accordance with the operation of the windshield wiper drive. An analog-to-digital converter is coupled to the voltage encoded signal for digitizing the voltage encoded signal and for outputting the digitized signal to the processor. A digital-to-analog converter is coupled to receive the control signal and converts the control signal from a digital signal to an analog signal for output to the drive circuit.

A sensing device, operatively arranged with the rotor of the ultrasonic motor, senses a position of the rotor and produces a rotor position signal related to the sensed position of the rotor. The actuation circuit is responsive to the rotor position signal for producing a second control signal in accordance with the operation of the windshield wiper drive. A peak signal detection circuit produces a peak detected signal from the rotor position signal and the processor is responsive to the peak detected signal for producing the second control signal.

The principles of operation of an ultrasonic motor of the type employed in the present invention is described in detail in U.S. Pat. No. 4,562,374, the disclosure of which is incorporated herein by reference.

Further advantageous features of the subject matter of the invention will be understood from the following description of the invention taken in conjunction with the accompanying drawings.

DESCRIPTION OF PREFERRED EMBODIMENTS

Figure 1:
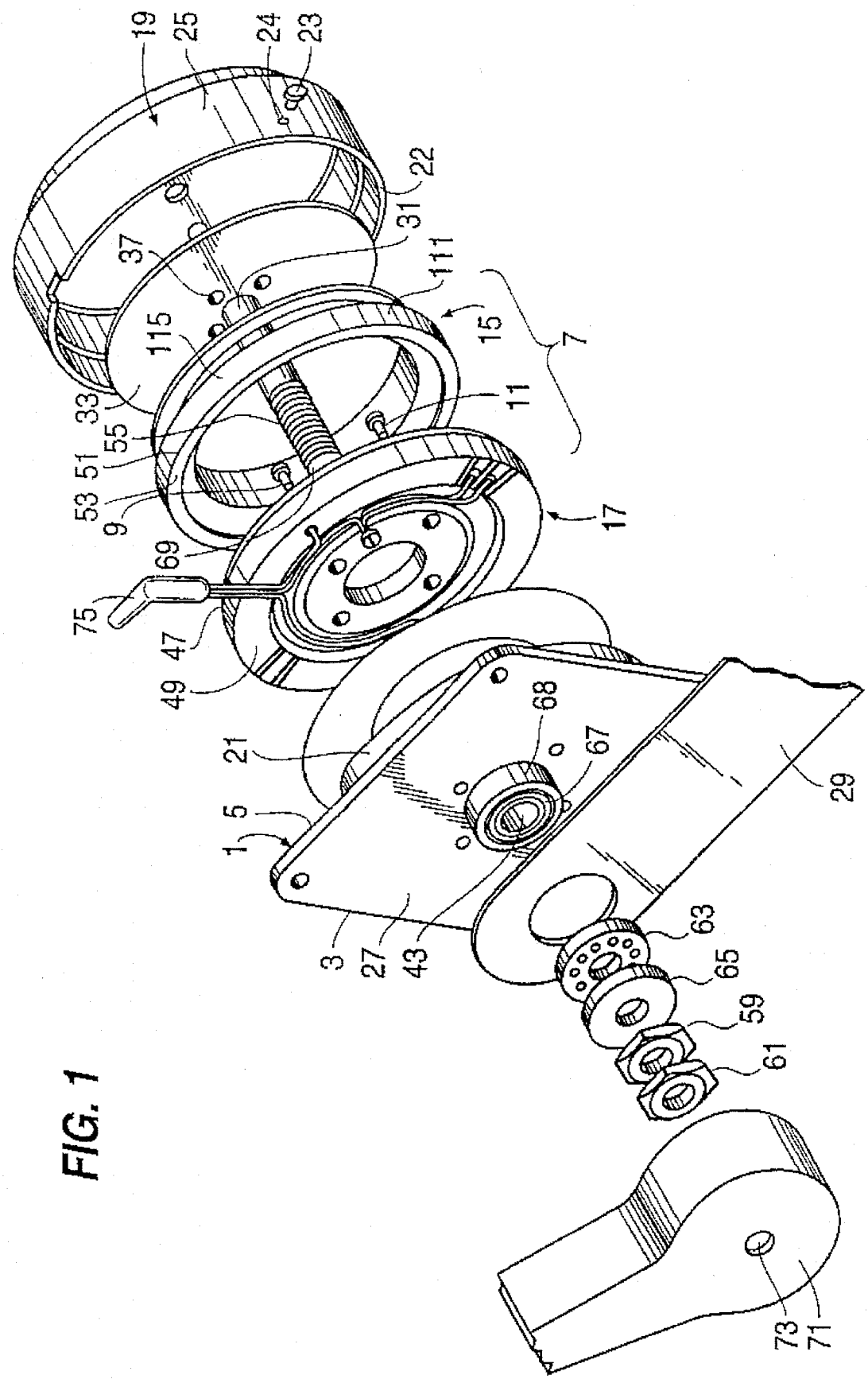
FIG. 1 is a perspective, exploded view of the individual components an embodiment of a windshield wiper drive according to the invention.
Figure 2:
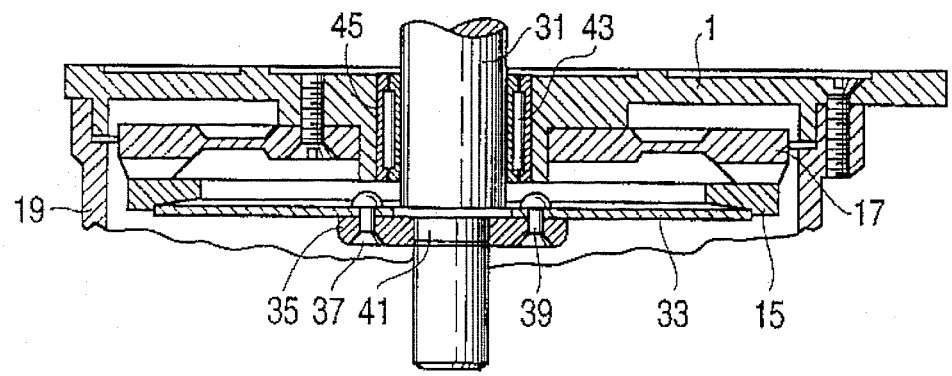
FIG. 2 is a partial axial sectional view of the motor housing including a stator and a rotor of the wiper drive according to the invention.
Figure 3:
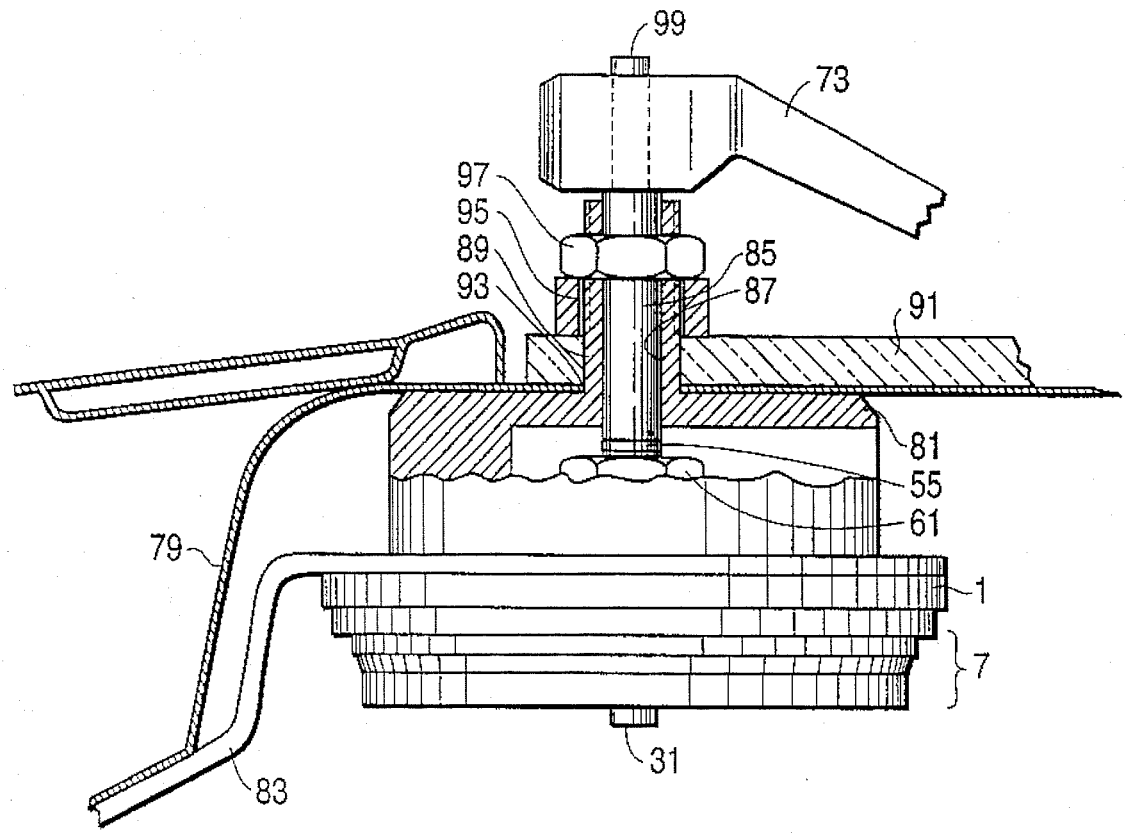
FIG. 3 shows a side view in partial axial section of the windshield wiper drive of the invention in the installed state.

FIGS. 1 to 3 depict an electrical windshield wiper drive for a vehicle, such as a motor vehicle, according to one preferred embodiment of the invention.

The windshield wiper drive includes a base plate 1 which, according to FIG. 1, can be fastened by way of a flange member 3 and suitable screw connections to the body of a motor vehicle in the region of the front or rear windshield. An electric motor drive element in the form of a self-locking ultrasonic motor 7 is connected by means of several screws 9, 11 or other fastening means with a rear face 5 of base plate 1. In a known manner, ultrasonic motor 7 includes a rotor 15 and a stator 17 which are enclosed by a cylindrical housing member 19. Housing member 19 is supported on a cylindrical attachment 21 and has an end face 22 which lies against rear face 5 of base plate 1, with housing member 19 being arrested by way of one or more set screws 23. Screws 23 can be screwed through threaded holes 24 in an outer face 25 of housing member 19. Housing member 19 serves as a cover which protects rotor 15 and stator 17 against water, oil and dust. It also prevents ultrasonic motor 7 from whistling. Base plate 1 has an end face 27 which serves as a cooling device for dissipating heat generated by ultrasonic motor 7 directly to the body of a vehicle or indirectly to the body of a vehicle by means of a heat dissipating metal sheet 29 which is a good conductor of heat. The service life of ultrasonic motor 7 is increased by such heat dissipation.

Ultrasonic motor 7 is arranged coaxially around a drive shaft 31. Near one end of drive shaft 31 (toward the right in FIG. 1), a plate spring 33 is fixed by a clamping ring 35 (see also FIG. 2). Clamping ring 35 is fixed to plate spring 33 by rivets 37 and 39 and is supported by way of a press fit on an attachment 41 of drive shaft 31. Near its other end, drive shaft 31 is rotatably mounted on a roller bearing 43 which is disposed in a bearing recess 45 in base plate 1. Plate spring 33 serves as a biasing device which urges rotor 15 against stator 17. Stator 17 includes an elastic member 47 and a piezoelectric member 49. Rotor 15 has an end face 51 provided with an adhesive layer 53 which is pressed against elastic member 47 of stator 17.

Drive shaft 31 has a free end 69 with an adjacent threaded region 55 that projects from roller bearing 43, the latter being surrounded by a cylindrical attachment 68. A nut 59 and a locknut 61 can be screwed onto threaded region 55, thus enabling the contact pressure of rotor 15 against stator 17 to be precisely set by means of resilient plate spring 33. In order to permit drive shaft 31 to perform a rotary movement after screw 59 has been tightened by means of locknut 61, an axial bearing 63 and a washer 65 are disposed between an end face 67 of cylindrical attachment 68 and screw 59. Finally, a bearing bore 73 of a windshield wiper arm 71 is fixed on free end 69 of drive shaft 31. FIG. 1 further shows a cable 75 for conducting electrical driving signals to the piezoelectric member constituting stator 17 as will be explained in greater detail below.

According to a modified embodiment shown in FIG. 3, base plate 1 is connected with a body portion 79 of a motor vehicle by an intermediate support member 81. Heat is dissipated over a metal heat dissipating sheet 83 which is in contact with body portion 79. Drive shaft 31 is here also fixed to an extension shaft 85 that is rotatably mounted in a bearing 87 of intermediate member 81. Intermediate member 81 has a cylindrical extension 89 which projects through bores 93 in vehicle body portion 79 and in a glass pane 91. Intermediate member 81 is fastened by way of a nut 97 that can be screwed onto a thread 95 on cylindrical extension 89. Extension shaft 85 has a free end 99 on which a windshield wiper arm 73 for glass pane 91 is supported. Ultrasonic motor 7 is constructed identically to FIG. 1.

In operation, when electrical driving signals are applied to piezoelectric member 49 of stator 17 by way of cable 75, piezoelectric member 49 causes elastic member 47 to vibrate in a known manner and an elastic wave is generated which propagates on the surface of elastic member 47. As a consequence, rotor 15 and its adhesive layer 53 are pressed onto elastic member 47 and begin to rotate together with drive shaft 31 due to the friction force generated by the elastic wave. Ultrasonic motor 7 is of simple construction, is compact and permits quiet operation. Since ultrasonic motor 7 is additionally easy to control, it is possible to drive windshield wiper arm 71, 73 in a simple manner.

Figure 4:
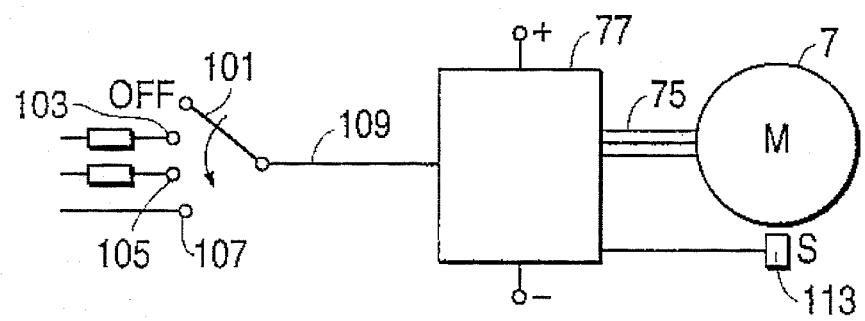
FIG. 4 is a block diagram of an electrical circuit for actuating the wiper drive of the invention.

FIG. 4 is a block diagram of a control circuit for motor 7 and thus of the windshield wiper arm (71, 73) which is connected directly with motor 7. By pivoting a steering column switch 101 from an "OFF" position into a position 103, 105 or 107, different voltage encoded signals (e.g., different voltage amplitudes) are applied through a single bus line 109 to an actuation circuit 77 which may include a microprocessor. Corresponding control signals are developed by actuation circuit 77 and sent through cable 75 to ultrasonic motor 7. The simplified bus control as shown in FIG. 4 makes the wiper drive versatile in its use with respect to an optimum wiper speed.

Figure 11:
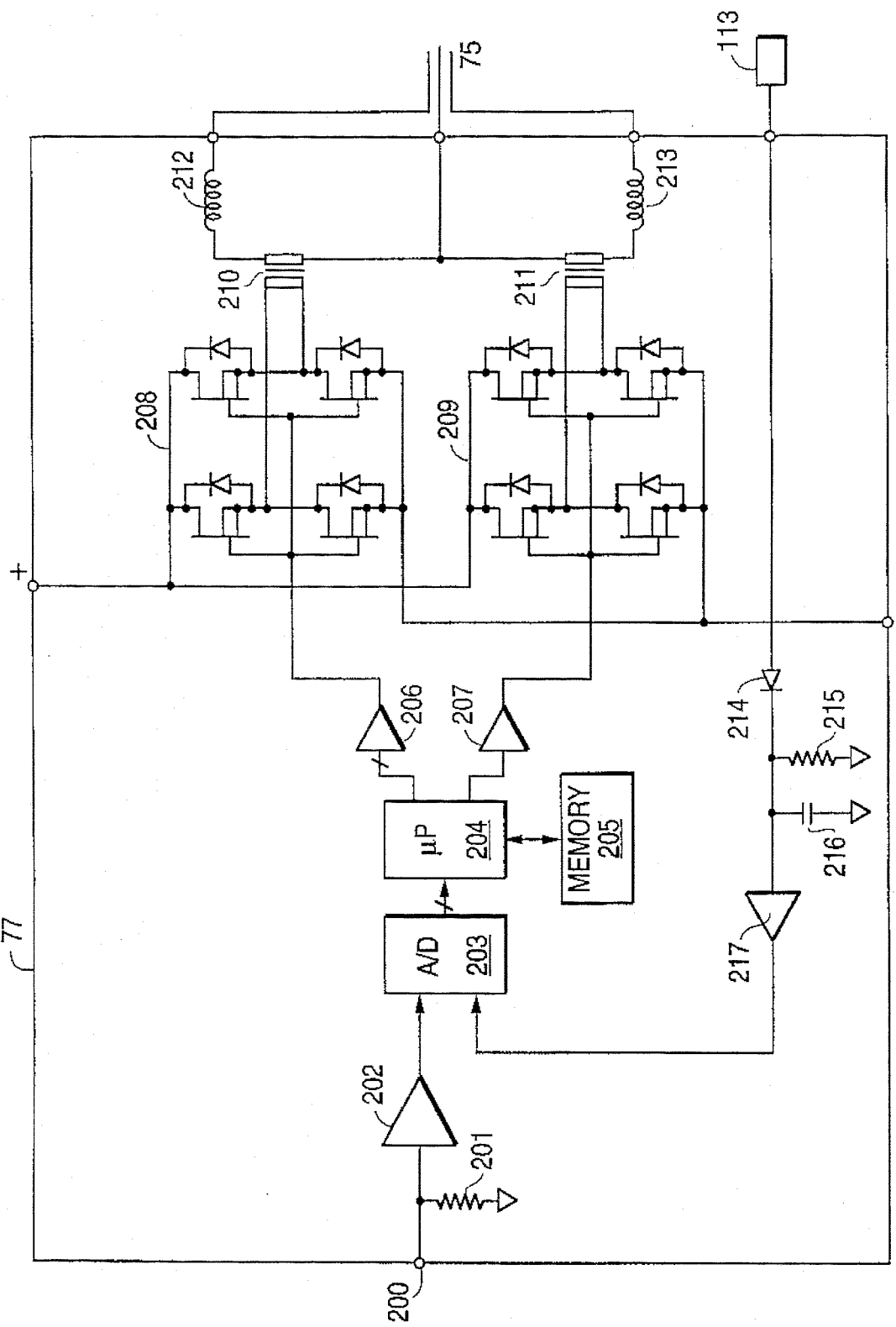
FIG. 11 is a circuit schematic of an exemplary configuration of an actuation circuit according to the present invention.

FIG. 11 shows a schematic block diagram of an exemplary configuration of actuation circuit 77. The voltage encoded signals applied to bus line 109 by the different positions of steering column switch 101 are input to actuation circuit 77 at input 200. A resistor 201 is connected between input 200 and a circuit common potential to form a voltage divider arrangement with resistors in steering column switch 101 (see FIG. 4). An input of an amplifier 202 is also connected to input 200. Amplifier 202 amplifies the voltage produced by the voltage divider arrangement and outputs the amplified signal to a first input of a two-input analog-to-digital converter (ADC) 203. The digitized output of ADC 203 is applied to an input of a microprocessor 204.

Microprocessor 204 executes a program stored in memory 205 for interpreting the digitized voltage output from ADC 203 as a control command for controlling the wiping operation of the wiper arm. Microprocessor 204 generates control signals at its outputs corresponding to the voltage encoded signals at input 200 which are applied to digital-to-analog converters (DACs) 206 and 207 for driving full bridge circuits 208 and 209, respectively. Bridges 208 and 209 drive transformers 210 and 211, respectively, which increase the control signals to levels required for driving the piezoelectric member of motor 7. The output control signals are applied to cable 75 for driving motor 7. Inductances 212 and 213 are connected in series with the output of the transformers 210 and 211 for compensating the capacitive impedance of the piezoelectric member.

The program executed by microprocessor 204 also monitors the oscillating state of motor 7 by detecting a voltage signal measured at sensor element 113. A peak value detector circuit formed by rectifier 214, resistor 215, capacitor 216 and amplifier 217 is coupled to sensor element 113. The output of amplifier 217 is coupled to a second input of the two-input ADC 203. ADC 203 is controlled in a known manner for selecting and digitizing the detected peak signal output from sensor 113. The digitized peak signal is output to microprocessor 204. Microprocessor 204 detects the digitized peak signal and, in response, generates control signals for driving bridge circuits 208 and 209 at a frequency corresponding to the magnitude of the detected peak signal. The magnitude range of the detected peak signal corresponds, for example, to the range of wiping frequency of motor 7.

The direction of rotation of motor 7 is set in a known way by the relative phase difference of the control signals to the two bridge 208, 209. For example, voltages which are applied to motor 7 having a 90° phase shift between the voltages results in a maximum clockwise rotating velocity, while a −90° phase shift between the motor voltages results in a maximum counter-clockwise rotating velocity. The wiping velocity can also be set at a value which is lower than the maximum velocity by a phase difference between the motor voltages which is less than 90° such that the lower velocity is proportional to the cosine of the phase difference between the motor voltages.

While actuation circuit 77 is shown configured with a microprocessor, other circuit configurations are contemplated, such as dedicated logic or an application specific integrated circuit (ASIC) configured to perform wiper control operations.

Figure 5:
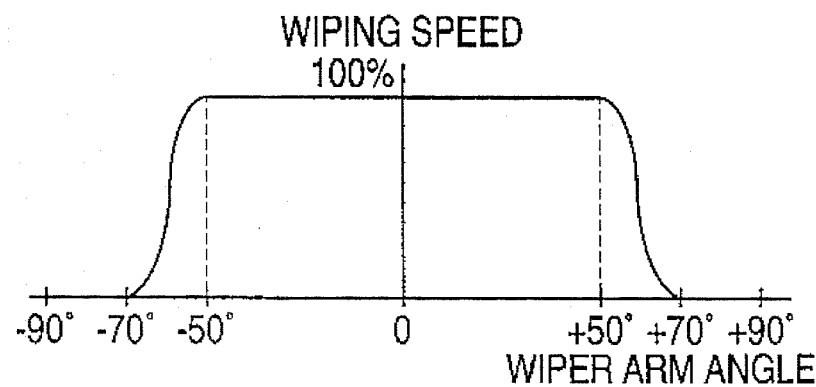
FIG. 5 shows a characteristic curve for the wiping speeds.

The RPM of the vibratory drive may be varied as a function of position of the wiper arm so that optimum wiping speeds can be realized over the entire wiping range. FIG. 5 shows a speed curve for windshield wiper arm (71, 73) and thus for the wiping lip (not shown) disposed thereon which shows that the reversal of the wiping lip on the wiper blade (not shown) at the point of reversal takes place slowly and the wiper speed is constant in the middle of the wiping range. This results in a long service life of the wiping lip and thus of the wiper blade.

Figure 6:
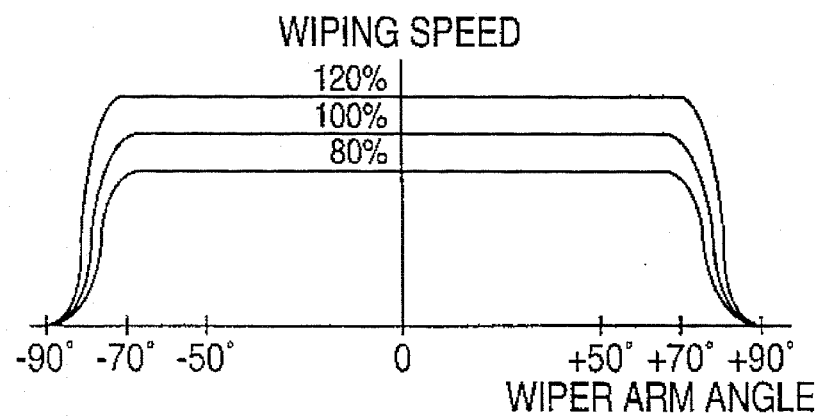
FIG. 6 shows characteristic curves for the optimum wiping speeds as a function of the amount of rain.

In addition to increasing the service life of the wiper blade, the novel gearless drive of the invention also results in an optimum wiping quality. For example, the wiping speed can be varied as a function of the amount of rainfall and thus as a function of the degree of wetness of glass pane 91 as shown, for example, in FIG. 6. For normal rainfall, a medium wiping speed of 100 percent is selected, while for heavy rain, the speed can be set at 120 percent of the medium speed and for drizzle, the wiping speed can be reduced to 80 percent of the medium speed.

Figure 7:
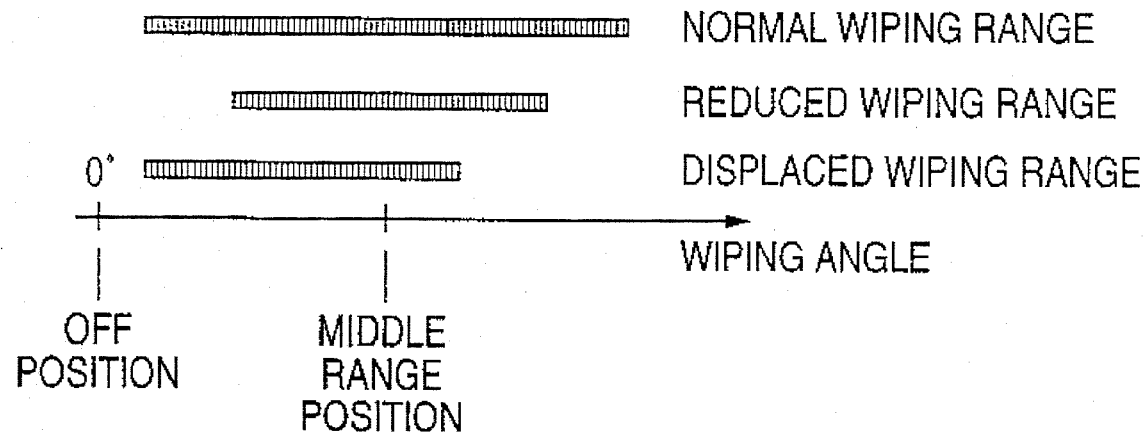
FIG. 7 is a schematic representation of various wiping ranges and the location thereof.

According to FIG. 7, wiping quality can additionally be increased in that in heavy rain the size of the wiping field can be reduced and/or moved. In heavy rainfall, it may not be necessary to completely free the passenger's field of view from rain.

FIG. 4 shows a position sensor 113 for sensing markers disposed on the rotor of motor 7 which are used for controlling the size of the wiping field, the location of the wiping field and the wiping speed. In this way, the position of rotor 15 and thus of windshield wiper arm 71, 73 can be determined. Position sensor 113 serves to detect a parked position of windshield wiper arm 71, 73 and the zero position of the wiper arm relative to numbered positions and to detect the markers on rotor 15 at which the speed is to be varied or for the wiper arm to be stopped.

Figure 8:
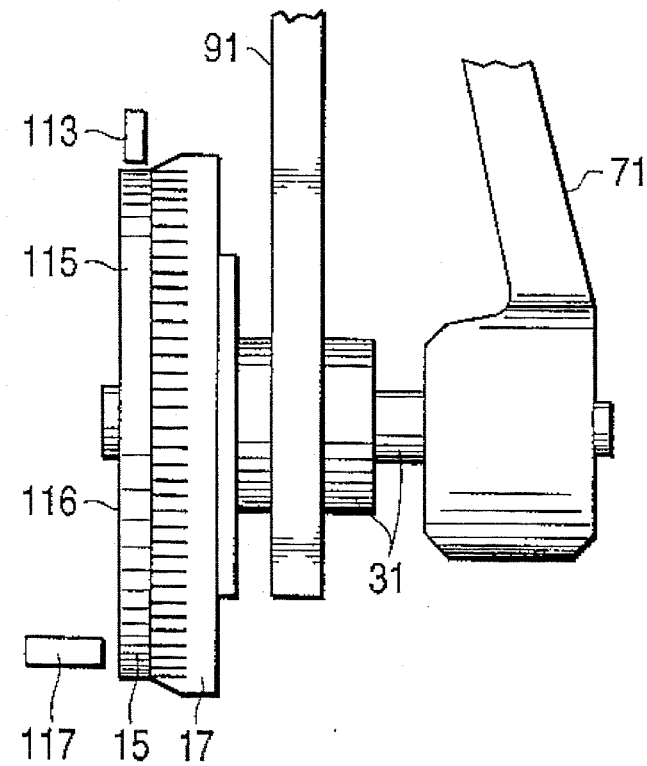
FIG. 8 shows arrangements of sensors for scanning rotor position in accordance with an aspect of the invention.

As shown in FIG. 8, position sensor 113 scans markers 111 disposed on the outer circumference 115 of rotor 15. Alternatively, it is within the scope of the invention, as also illustrated in FIG. 8, to scan an end face 116 of rotor 15 by way of a position sensor 117, in which case end face 116 is then provided with the appropriate markers.

Figure 9:
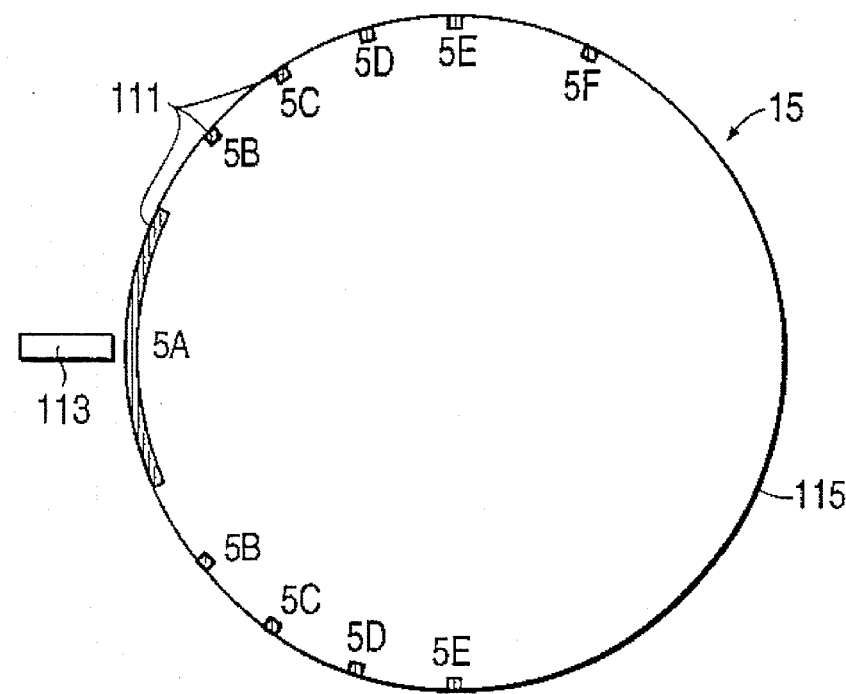
FIG. 9 shows rotor scanning and markers disposed on the outer circumference of the rotor according to a further embodiment of the invention.

FIG. 9 shows an embodiment for determining the position of rotor 15 and thus of the windshield wiper arm which is directly connected with the rotor. Markers 111 are disposed on outer circumference 115 of rotor 15. Markers 111 are scanned by means of position sensor 113 configured as an optical sensor capable of distinguishing between light and dark regions. A broad dark region 5A serves as a zero position for numbering the positions of the rotor while the other markers 5B, 5C, 5D and 5E serve the function of changing the wiper speed and stopping the wiper. The wiper is stopped by way of marker 5E, while marker 5F directs windshield wiper arm into its end position or its parked position when it is turned off. The interpretation of the individual markers is dependent on a control program in actuation circuit 77 so that, during normal wiping operation over the full wiping range, the wiping speed is slowly reduced to a minimum when marker 5D is reached. If the wiping range is reduced, the reduction of the speed begins at markers 5C, while the speed reversal takes place at markers 5D. If the wiping field is moved, the corresponding markers are 5B and 5C in the one direction and 5D and 5E are the corresponding markers in the other direction. The parked position is always determined by marker 5F.

Within the scope of the invention, markers 111 may be configured as bright-dark points or also as recesses. In the latter case, position sensor 113 is then a distance sensor. Markers 111 may obviously be composed of other coded elements in which case an appropriately configured scanning sensor would be used to scan the markers.

Figure 10:
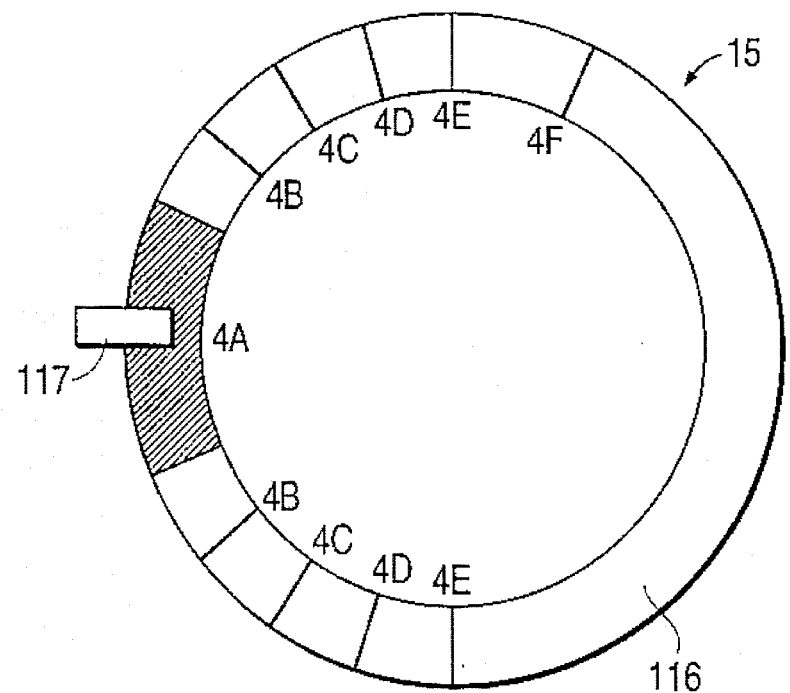
FIG. 10 shows rotor scanning and markers disposed on an end face of the rotor according to yet another embodiment of the invention.

In FIG. 10 the markers are disposed on end face 116 of rotor 15 which is scanned by position sensor 117. Here again the light-dark markers are identified as 4A to 4F, with their functions corresponding to markers 5A to 5F of FIG. 9.

The electrical windshield wiper drive of the invention is distinguished by being driven directly by way of an ultrasonic motor 7 which involves a relatively small number of required components, thus permitting the drive to be manufactured in an economical manner. The ultrasonic motor employed in the present invention operates quietly and has an improved response behavior, improved controllability and improved efficiency. In addition, the cooling device provided for ultrasonic motor 7 considerably improves its service life. The gearless ultrasonic motor also operates with frequencies in the ultrasonic range so that no audible noises are generated. Moreover, the ultrasonic motor can be reversed very quickly so that a reversal of the direction of rotation can be utilized in order to generate the back and forth wiper movement. Further, the size of the wiping field, the position of the wiping field and wiper speeds can be varied by free selection of the reversal points depending on desired requirements. The rate of rotation of the ultrasonic motor and of the vibratory drive may be varied as a function of position so that a uniform wiping movement in the middle of the wiping range is possible in order to obtain good wiping quality together with a sensitive reversal in the reversal region in order to realize a long service life for the wiper blade.

Obviously, numerous and additional modifications and variations of the present invention are possible in light of the above teachings. It is therefore to be understood that within the scope of the appended claims, the invention may be practiced otherwise than as specifically claimed.

What is claimed is:

1. An electrical windshield wiper drive for a vehicle, comprising:
    a windshield wiper arm;
    an ultrasonic motor including:
        a drive shaft connected to said windshield wiper arm for rotatably driving said windshield wiper arm;
        a rotor to which said drive shaft is connected;
        a stator including an electromechanical transducer connected to electrical leads and an elastic member surrounding said electromechanical transducer, said electromechanical transducer being caused to vibrate in response to electrical driving signals applied to said electrical leads and propagating an elastic wave in said elastic member, said rotor being operatively arranged with said stator such that a frictional force is generated by the elastic wave between said rotor and said elastic member causing said rotor together with said drive shaft to rotate;
    signal means for selectively producing voltage encoded control signals for controlling windshield wiper functions;
    position sensing means operatively arranged with said rotor for sensing positions of said rotor; and
    an actuation circuit operatively connected to said ultrasonic motor and receiving rotor position signals from said position sensor and the voltage encoded control signals from said signal means and in dependence thereof emitting actuating signals for actuating said ultrasonic motor.

2. A windshield wiper drive as defined in claim 1, and further comprising heat conducting means attached to said ultrasonic motor and for connection to a body portion of the vehicle for conducting away heat generated by said ultrasonic motor.

3. A windshield wiper drive as defined in claim 2, wherein the said heat conducting means includes a base plate to which said ultrasonic motor is fastened, said base plate having a flange member which can be placed in heat dissipating connection with a sheet metal body portion of the vehicle.

4. A windshield wiper drive as defined in claim 2, further comprising a metal heat dissipating sheet composed of a metal that is a good thermal conductor arranged to be disposed between said flange member and the body portion of the vehicle, and wherein said base plate is made of metal.

5. A windshield wiper drive as defined claim 3, and further comprising a housing enclosing said ultrasonic motor and fixed to said base plate.

6. A windshield wiper drive as defined in claim 3, and further comprising spring means fixed to one end of said drive shaft for urging said rotor into contact with said stator.

7. A windshield wiper drive as defined in claim 6, wherein said ultrasonic motor includes setting means for setting a contact pressure between said rotor and said stator.

8. A windshield wiper drive as defined in claim 7, and further comprising a roller bearing attached to said base plate, wherein said setting means comprises a thread accommodated on another end of said drive shaft which projects through said roller bearing, and at least one nut that can be screwed onto said other end of said drive shaft for adjusting a spring force of said spring means for setting the contact pressure of the rotor against the stator.

9. A windshield wiper drive as defined in claim 8, wherein said other end of said drive shaft is connected with said windshield wiper arm.

10. A windshield wiper drive as defined in claim 1, wherein said position sensing means comprises an optical sensor able to detect light and dark for scanning markers disposed on said rotor.

11. A windshield wiper drive as defined in claim 10, wherein said rotor has a circumferential face including markers disposed thereon.

12. A windshield wiper drive as defined in claim 10, wherein said rotor has an end face including markers disposed thereon.

13. A windshield wiper drive as defined in claim 10, wherein the markers are composed of light-dark points that can be scanned by said optical sensor.

14. A windshield wiper drive as defined in claim 10, wherein said rotor includes markers which can be detected by the position sensor for determining a parked position, a wiper zero position for numbering positions of said rotor and points at which speed of said rotor is to be varied and at which said rotor is to be stopped.

15. A windshield wiper drive as defined in claim 1, wherein said actuating circuit includes means for actuating said ultrasonic motor in a manner to control wiping field size of said windshield wiper arm.

16. A windshield wiper drive according to claim 15, wherein said actuating circuit includes means for actuating said ultrasonic motor in a manner to move the wiping field of said windshield wiper arm.

17. A windshield wiper drive as defined in 1, wherein said actuating circuit includes means for actuating said ultrasonic motor to vary wiping speed of said windshield wiper arm.

18. A windshield wiper drive as defined in claim 1, wherein said actuating circuit includes means for slowly reducing wiping speed to zero at reversal points of said windshield wiper arm.

19. An electrical windshield wiper drive for a vehicle comprising:
    an ultrasonic motor having a drive shaft connected to said windshield wiper arm for rotatably driving said windshield wiper arm;
    an actuation circuit for driving the ultrasonic motor; and
    signal means for selectively producing voltage encoded signals for controlling an operation of the windshield wiper drive, wherein the actuation circuit is responsive to the voltage encoded signals for driving the ultrasonic motor.

20. An electrical windshield wiper drive for a vehicle comprising:
    an ultrasonic motor having a drive shaft connected to said windshield wiper arm for rotatably driving said windshield wiper arm;
    an actuation circuit for driving the ultrasonic motor;
    signal means for selectively producing a voltage encoded signal for controlling an operation of the windshield wiper drive; and
    an actuation circuit including,
        a processor, responsive to the voltage encoded signal, for producing a control signal corresponding to the operation of the windshield wiper drive, and a drive circuit, responsive to the control signal, for producing a drive signal for driving the ultrasonic motor.

21. A windshield wiper drive as defined in claim 20, wherein the actuation circuit further includes, an analog-to-digital converter for digitizing the voltage encoded signal and for outputting the digitized signal to the processor; and a digital-to-analog converter, coupled to receive the control signal output from the processor, for converting the control signal from a digital signal to an analog signal for output to the drive circuit.

22. A windshield wiper drive as defined in claim 21, wherein the drive circuit includes a full bridge circuit coupled to receive the analog signal output from the digital-to-analog converter.

23. A windshield wiper drive as defined in claim 20, further comprising position sensing means operatively arranged with a rotor of the ultrasonic motor for sensing a position of the rotor and for producing a rotor position signal related to a sensed position of the rotor, wherein the actuation circuit is further responsive to the rotor position signal for producing another control signal.

24. A windshield wiper drive as defined in claim 23, wherein the actuation circuit includes a peak signal detection circuit coupled to receive the rotor position signal, the peak signal detection circuit producing a peak detected signal from the rotor position signal, and wherein the processor is responsive to the peak detected signal for producing the another control signal.

25. A windshield wiper drive as defined in claim 24, further comprising an analog-to-digital converter for digitizing the peak detected signal and outputting the digitized peak detected signal to the processor.

* * * * *